(12) United States Patent
Basquin et al.

(10) Patent No.: US 10,456,964 B2
(45) Date of Patent: Oct. 29, 2019

(54) METHOD FOR PRODUCING A SUPPORT ELEMENT FOR A VEHICLE

(71) Applicant: Faurecia Innenraum Systeme GmbH, Hagenbach (DE)

(72) Inventors: Guillaume Basquin, Wissenbourg (FR); Denis Wolf, Niedersoultzbach (FR); Lidia Chapeau, Karlsruhe (DE)

(73) Assignee: FAURECIA INNENRAUM SYSTEME GMBH, Hagenbach (DE)

( * ) Notice: Subject to any disclaimer, the term of this patent is extended or adjusted under 35 U.S.C. 154(b) by 311 days.

(21) Appl. No.: 14/910,538

(22) PCT Filed: Apr. 10, 2014

(86) PCT No.: PCT/EP2014/057302
§ 371 (c)(1),
(2) Date: May 4, 2016

(87) PCT Pub. No.: WO2015/022086
PCT Pub. Date: Feb. 19, 2015

(65) Prior Publication Data
US 2016/0250787 A1 Sep. 1, 2016

(30) Foreign Application Priority Data
Aug. 14, 2013 (DE) .................. 10 2013 216 191

(51) Int. Cl.
*B29C 45/14* (2006.01)
*B29C 44/14* (2006.01)
(Continued)

(52) U.S. Cl.
CPC ........ *B29C 45/1418* (2013.01); *B29C 44/146* (2013.01); *B29C 44/586* (2013.01);
(Continued)

(58) Field of Classification Search
CPC .................. B29C 45/1418; B29C 44/146
See application file for complete search history.

(56) References Cited

U.S. PATENT DOCUMENTS

| 2,847,712 A | 8/1958 | Pollard et al. |
| 4,531,994 A * | 7/1985 | Holtrop .................. B32B 5/32 |
| | | 156/307.3 |

(Continued)

FOREIGN PATENT DOCUMENTS

| DE | 102004054228 A1 * | 6/2006 | ......... B29C 45/1418 |
| DE | 102004054228 A1 | 6/2006 | |

(Continued)

OTHER PUBLICATIONS

English summary of International Search Report corresponding to International application No. PCT/EP2014/057302, dated Oct. 29, 2014, 3 pages.

(Continued)

*Primary Examiner* — Jacob T Minskey
*Assistant Examiner* — Melody Tsui
(74) *Attorney, Agent, or Firm* — Reising Ethington P.C.

(57) ABSTRACT

The invention relates to a method for producing a support element for a means of transport, wherein the method comprises: —providing a polypropylene/natural fiber mat (106), wherein the mat (106) has a basis weight of less than 1150 g/m², wherein the polypropylene/natural fiber mat (106) comprises a first type of natural fibers, —preheating the mat (106), —placing the mat (106) in a mold (100), wherein the mold (100) has a rib-shaped cavity (112), —pressing the mat (106) into a predefined form by the mold (100), so that the thickness of the mat (106) after the pressing is less than 1.5 mm—immediately and directly after the pressing, insert molding the mat (106) by injecting a polypropylene-containing material into the rib-shaped cavity, wherein the insert molding has the effect that the material (Continued)

Figure 1:
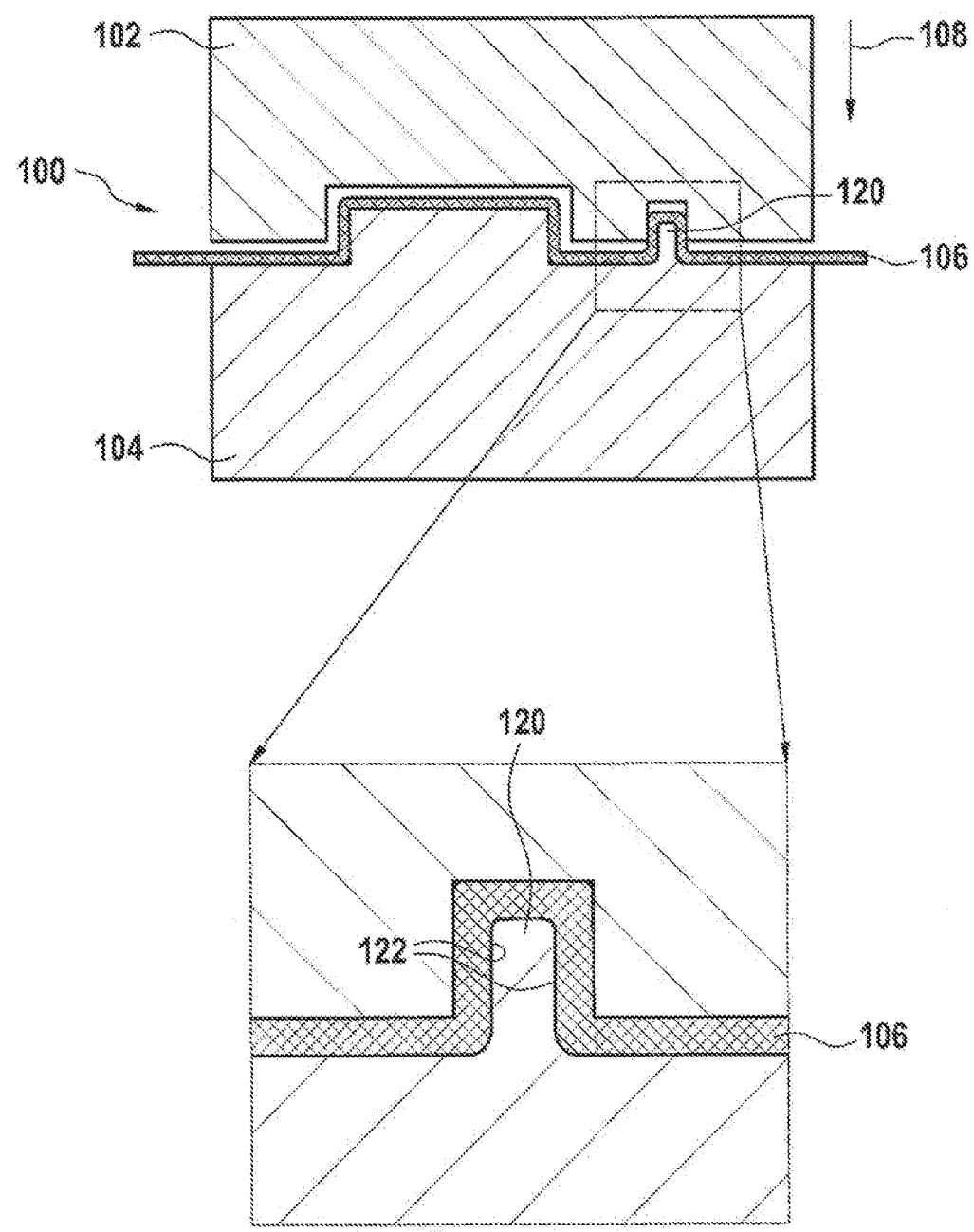

forms stiffening ribs (200) that are integrally bonded with the mat (106), —demolding the mat (106) comprising the stiffening ribs (200).

18 Claims, 4 Drawing Sheets

(51) Int. Cl.
    *B29C 44/58*      (2006.01)
    *B60R 13/02*      (2006.01)
    *B29L 31/30*      (2006.01)
    *B29C 43/00*      (2006.01)
    *B29K 23/00*      (2006.01)

(52) U.S. Cl.
    CPC ........ *B29C 45/14786* (2013.01); *B60R 13/02* (2013.01); *B29C 43/003* (2013.01); *B29C 2045/14442* (2013.01); *B29K 2023/12* (2013.01); *B29L 2031/302* (2013.01); *B29L 2031/3005* (2013.01)

(56) References Cited

U.S. PATENT DOCUMENTS

| | | |
|---|---|---|
| 5,089,206 A | 2/1992 | Kia |
| 5,356,588 A | 10/1994 | Hara et al. |
| 7,943,074 B2 * | 5/2011 | Schilles ................ B29C 43/146 |
| | | 264/257 |
| 2006/0162278 A1 * | 7/2006 | Braun ................... B60R 13/083 |
| | | 52/782.11 |
| 2011/0062686 A1 * | 3/2011 | Buhler ................ B60R 21/2165 |
| | | 280/728.3 |
| 2013/0082416 A1 * | 4/2013 | Wakeman ............... B29C 33/14 |
| | | 264/259 |
| 2014/0342119 A1 | 11/2014 | Kastell et al. |

FOREIGN PATENT DOCUMENTS

| | | |
|---|---|---|
| DE | 102010054195 A1 | 6/2012 |
| DE | 102011106883 A1 | 1/2013 |
| DE | 102012100358 A1 | 7/2013 |
| EP | 0547625 A1 | 6/1993 |
| EP | 0985519 A2 | 3/2000 |
| EP | 1671847 A1 | 6/2006 |
| EP | 1707336 A1 | 10/2006 |
| FR | 2787055 A3 | 6/2000 |
| FR | 2843065 A1 | 2/2004 |
| JP | H02167713 A | 6/1990 |
| WO | WO2013052378 A1 | 4/2013 |

OTHER PUBLICATIONS

German Office action corresponding to DE application No. 102013216191.3, dated Aug. 19, 2015, 6 pages, not translated.
German office action in German for application No. 102013216191.3, dated Jan. 29, 2018, 10 pages.

* cited by examiner

METHOD FOR PRODUCING A SUPPORT ELEMENT FOR A VEHICLE

The invention relates to a method for producing a support element for a transport means and to a support element produced by such a method.

Various support elements for transport means, such as rail vehicles, motor vehicles, aircraft and the like, are known from the prior art. By way of example, support elements are used as motor vehicle interior trim parts. In this case, besides decorative materials, the support elements also support functional elements such as loudspeakers, window lifters or airbag devices. Furthermore, a support element may be used for example in the form of a door module.

By way of example, EP 0 547 625 A discloses an object having a rib structure, said object consisting of a thermoplastic.

The object of the invention is to provide an improved method for producing a support element for a transport means and also a corresponding support element. The objects addressed by the invention are achieved by the features of the independent claims. Preferred embodiments of the invention are specified in the dependent claims.

A method for producing a support element for a transport means is specified, wherein the method comprises the steps of:

providing a polypropylene-natural fiber mat, wherein the mat has a basis weight below 1150 g/m$^2$ (preferably 850 g/m$^2$), wherein the polypropylene-natural fiber mat (160) comprises a first type of natural fibers, pre-heating the mat, placing the mat in a tool, wherein the tool has a rib-shaped cavity, pressing the mat into a predefined form by the tool such that the thickness of the mat after the pressing is less than 1.5 mm, preferably equal to or less than 0.9 mm, immediately and directly after the pressing, insert molding the mat by injecting a polypropylene-containing material into the rib-shaped cavity, wherein, on account of the insert molding, the material forms stiffening ribs bonded integrally to the mat, demolding the mat comprising the stiffening ribs.

Here, the insert molding of the mat takes place in the same tool with which the mat has been pressed. The mat, during the insert molding, thus remains in the tool under the pressing pressure which was also used for the pressing of the mat. By way of example, the tool has an upper and a lower tool half. The lower tool half comprises the rib-shaped cavity.

The mat is placed on the lower tool half for pressing, and the tool is closed. During the closing process the upper tool half exerts a contact pressure onto the lower tool half via the mat. Due to the contact pressure, the mat is brought into its desired form and is compressed. Whilst this contact pressure is still effective, the polypropylene-containing material is injected into the rib-shaped cavity such that the stiffening ribs are formed.

These features make it possible on the one hand to provide a high process speed when producing the support element, since a demolding must only take place once. On the other hand, embodiments of the invention could have the advantage that a particularly lightweight support element is created, which, however, does not sustain any losses in respect of its stability compared with conventional support elements. Whereas mats known from the prior art have a basis weight far above 1300 g/m$^2$ and a thickness of more than 1.6 mm, material which is thinner and lighter can also be processed with the described method. Since the mat is insert molded by the polypropylene-containing material directly and immediately after the pressing process, it is ensured that the mat has precisely defined material properties.

This is highly relevant in the case of mats having such a form, since the fundamental mechanical stability is already weakened on account of the low basis weight. It has been identified here that an optimization of the production process may thus positively influence the material properties and that the overall stability can thus be increased on account of the described method sequence.

The mat and material in the case of the method described here maintain their temperature such that a melting process of mat and material can be ensured in an optimal manner in order to obtain the integrally bonded stiffening ribs.

It should be noted that, for example in the case of a pause longer than 10 seconds between the end of the pre-heating process and the start of the pressing process, a permanent temperature-control of the pressed mat is inevitably necessary in order to achieve the same effect. This may lead for example to an undesirable chemical structural change within the mat such that the desired high stability (high coefficient of elasticity) might not be ensured. In addition, it should be noted that the thermoplastic material within the mat is preferably still viscous on account of the described method, so as to allow the mat to deform more easily and without tearing, even during the insert molding process. In addition, a good adhesion between mat and the stiffening ribs is produced as a result.

In accordance with one embodiment of the invention the polypropylene-containing material comprises a second type of natural fibers. The first and the second type of natural fibers may be identical, such that the polypropylene-containing material comprises the same natural fibers as the mat. The use of natural fibers in polypropylene-containing material could have a number of advantages:

On the one hand the material having natural fibers has a lower density, which lowers the resultant basis weight. Furthermore, it could be ensured that a mixing and physical bonding and even integral bonding of the natural fibers of the mat and of the material could take place by means of the insert molding process. This could increase the cohesion between ribs or also further functional elements and mats insert molded by means of this method, such that the bonding stability of the ribs to the mat is increased on the whole. The mechanical stability of the mat is thus increased on the whole.

On the other hand, it could be ensured that during the cooling process of the insert-molded mat, once said mat has been insert molded, a warping of the mat is minimized or even prevented. On account of the low basis weight of the mat, this could be very susceptible to severe temperature-induced shrinkages of the stiffening ribs. Experiments have shown that, due to the use of the polypropylene-containing material having the second type of natural fibers, the coefficient of thermal expansion of the molded stiffening ribs can be kept low. The stiffening ribs thus "shrink" only to a very small extent during the cooling process, whereby it could be ensured that the mat does not warp as it cools. A warping would be provided for example with the use of pure polypropylene as material for the stiffening ribs.

Since, in addition, the polypropylene-containing material comprises the second type of natural fibers, the modulus of elasticity increases. This causes the stiffening ribs to be very stable, rigid and resistant to tearing with respect to a stretching. The modulus of elasticity is preferably greater than 2000 MPa, in particular greater than 2400 MPa. This could cause the overall stability of the mat when exposed to twisting and deformation to be increased on account of the establishment of a deep bonding between stiffening ribs and mat.

Furthermore, the specific heat capacity of the material could be reduced by the provision of the second type of natural fibers in the polypropylene-containing material. This could increase the cooling rate of the insert-molded mat. The production time for an individual mat could thus be shortened.

In accordance with one embodiment of the invention the polypropylene-containing material is foamed. This could contribute to the fact that the risk of shrinkage or volumetric shrinkage during the cooling process is reduced. The blowing agent used for foaming or the injected gas causes gas bubbles to form in the injection molding material, which bubbles may at least partially compensate for the material shrinkage. An expansion of the material thus counteracts a shrinkage. A further advantage of the foam could be the increased ratio between volume and weight on account of the foam. In other words, as a result of the foaming it is possible to dispense with material without, however, reducing the size of the available ribs. This reduces the overall weight whilst maintaining stability.

With regard to the foaming there are two different possibilities: a) chemical method by adding blowing agents (generally 2-5%); b) physical method by means of injection of gases (usually N2 or CO2) or liquefied gases, such as in the MuCell method, in which the gas is introduced into the already liquefied mass.

The foaming may optionally be performed by means of what is known as a Core-Back Expansion (CBE) method, in which, following the injection of the gas, the foaming tool is opened a little in order to give the material space to foam up. In the case of the CBE method the polypropylene material is expanded in the direction in which the tool is opened.

In accordance with one embodiment of the invention the tool has two mutually opposed parts, wherein the mat is placed in the tool between the two parts, wherein the pressing is performed by closing the tool on account of a reduction of the distance between the parts, wherein the part of the tool comprising the rib-shaped cavity comprises protrusions for laterally delimiting the cavity, wherein the protrusions protrude in the direction of the other part of the tool. By way of example, the rib-shaped cavity is arranged on the upper tool half, wherein each of the protrusions protrudes to the left and right along the rib-shaped cavity from the upper tool half in the direction of the lower tool half. These protrusions could be used to prevent a discharge of the polypropylene-containing material from the closed tool. The protrusions are used for example as a sealing lip with respect to adjacent regions.

The ribs are preferably much higher than they are wide, since it is the height of the ribs and not the width thereof that increases the rigidity.

Waste material of the mat that accumulates during the production of the support element can preferably be mixed newly with polypropylene, and the stiffening ribs can be produced from this recycling material. When the material of the mat preferably comprises 40% natural fiber proportion, the recycled material may thus comprise a natural fiber proportion of 10-20%. Experiments have surprisingly shown that this is sufficient to ensure a high overall stability with low basis weight of the support element.

In accordance with one embodiment of the invention the polypropylene-containing material is heated for the insert molding process to 180-200° C., in particular 190° C., and the mat is pre-heated to 180-220° C., in particular 200°. A defined temperature difference is thus provided between material and mat, which in a particularly efficient manner ensures a stable connection between mat and ribs. In addition, the natural fibers could thus be prevented from disintegrating at excessively high temperatures.

In accordance with one embodiment of the invention the pressed mat has a basis weight of less than 1150 g/m$^2$ and a density of more than 0.8 g/cm$^3$. Nevertheless, it is ensured by the above-described method that the resultant support element is highly stable and yet suitable for use in transport means. Even in the event of a crash, a support element produced in accordance with the above-described method is able to transfer significant forces to surrounding structural components without breaking.

In accordance with a further embodiment of the invention the tool forms depressions in the mat during the pressing, wherein the depressions extend parallel to the rib-shaped cavity, wherein the stiffening ribs completely fill out the depressions and protrude from the depressions in a rib-shaped manner on account of the insert molding. To give a detailed example, the depressions thus form receptacles for the stiffening ribs. This could have the advantage that, during the insert molding process, the material is bonded not only over the surface of the mat, but also at the same time over the side walls of the depressions.

In accordance with one embodiment of the invention the ratio of rib height to rib width of the stiffening ribs is greater than 3. In addition, the distance between stiffening ribs extending parallel to one another is between 2.5 times to 5 times the height of the stiffening ribs, for example. This could constitute an optimal compromise between a large number of stiffening ribs, which significantly increase the overall stability of the support element, and a minimum number of stiffening ribs, which minimize the weight of the support element. By way of example, a greater height of the ribs could thus contribute to the fact that the flexural rigidity of the support element is increased. However, the overall weight of the support element resulting from the high ribs also increases as a result of a high rib height. A rib height that is too low could indeed cause an overall weight of the support elements to be kept low, however the desired flexural rigidity is no longer provided.

In accordance with one embodiment of the invention the tool has two mutually opposed parts, wherein on one of said parts there is arranged a punch (advancer) movable relative to said part in the direction of the opposite part, wherein the mat is placed in the tool between the two parts, wherein the pressing is performed by closing the tool on account of a reduction of the distance between the parts, wherein, once the mat has been placed and before the pressing of the punch, the mat is pressed at predefined points onto the part opposite the punch, wherein the points are selected such that a stretching of the mat as the tool is closed is avoided. It could thus be ensured that, once the pressing process has been completed, the mat has at all points the same defined basis weight and therefore also the same predefined density. The mechanical properties of the mat after the pressing process are therefore independent of the pressing process itself.

In accordance with one embodiment of the invention the mat has inner and/or outer edges to recesses of the mat, wherein the predefined form comprises bulged regions of the edges. The recesses of the mat are understood to be both recesses within the mat, such as holes, and edge regions of the mat, such as an outer circumferential edge, which defines the outer contour of the mat. In the case in which the recesses comprise holes, the bulged regions preferably surround the holes completely. Due to the provision of the bulged regions, the flexural rigidity of the mat could be further increased at weaker points of the mat, i.e. at points which border the recesses.

It should be noted that the bulged regions of the edges may result from the pressing process of the mat. However, it is also possible for the edges to also result from a corresponding insert molding process of the mat by injection of said polypropylene-containing material in a corresponding mating cavity.

In accordance with one embodiment of the invention the pressing of the mat is performed such that the mat is pressed to a lesser extent at points at which the stiffening ribs are insert molded than at points which are free from stiffening ribs. This could have the advantage that at points of the mat at which the stiffening ribs are insert molded, the mat is pressed to a lesser extent and is thus more porous. The polypropylene melted during the insert molding process could thus bond better to the mat. The mechanical bonding of the ribs to the mat could thus be improved. Since the insert molding process takes place with sufficiently high pressure, the corresponding raised portions of the mat resulting from the non-pressing process are still compressed.

In accordance with one embodiment of the invention the tool is unheated. This means that, following the pre-heating and optional calibration of the mat, this is placed immediately in the tool and the pressing process is then performed immediately. The mat is then insert molded immediately after the pressing process. Although the tool is not heated, due to the quick sequence of the pressing and insert molding steps, the temperature of the mat can be kept far enough above a level that the mat can be formed easily and the insert molding process ensures a good bonding between mat and ribs without further subsequent heating.

In a further aspect the invention relates to a support element for a transport means produced in accordance with one of the method steps of the above-described method.

In accordance with one embodiment of the invention the support element is a motor vehicle interior trim part.

In accordance with one embodiment of the invention the support element has a basis weight below 1250 g/m$^2$, preferably below 1000 g/m$^2$.

Preferred embodiments of the invention will be explained in greater detail hereinafter on the basis of the drawings.

Figure 2:
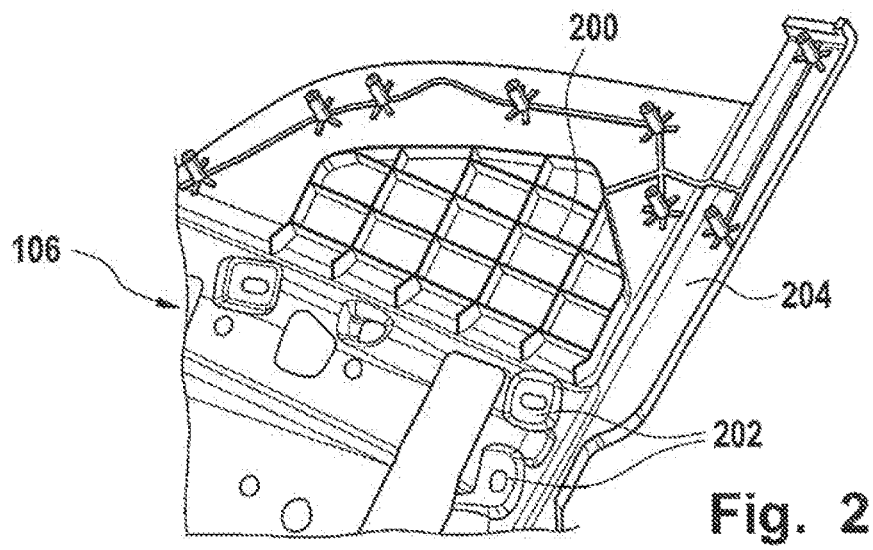
Figure 3:
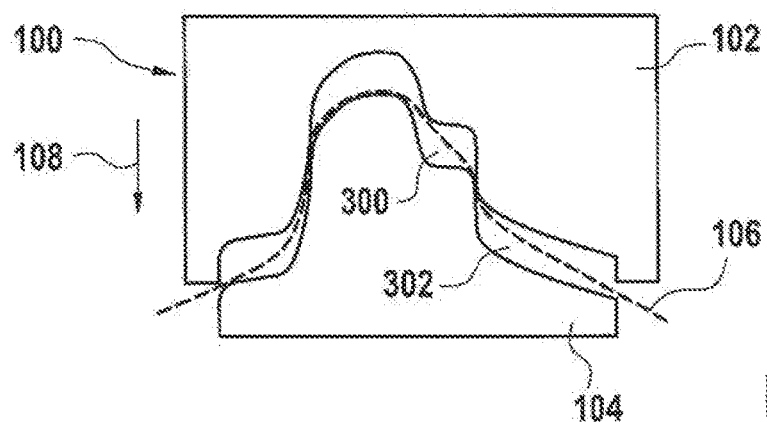
Figure 4:
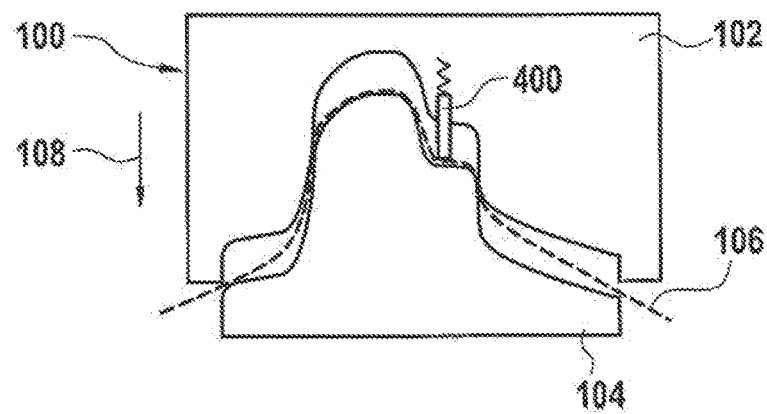
Figure 5:
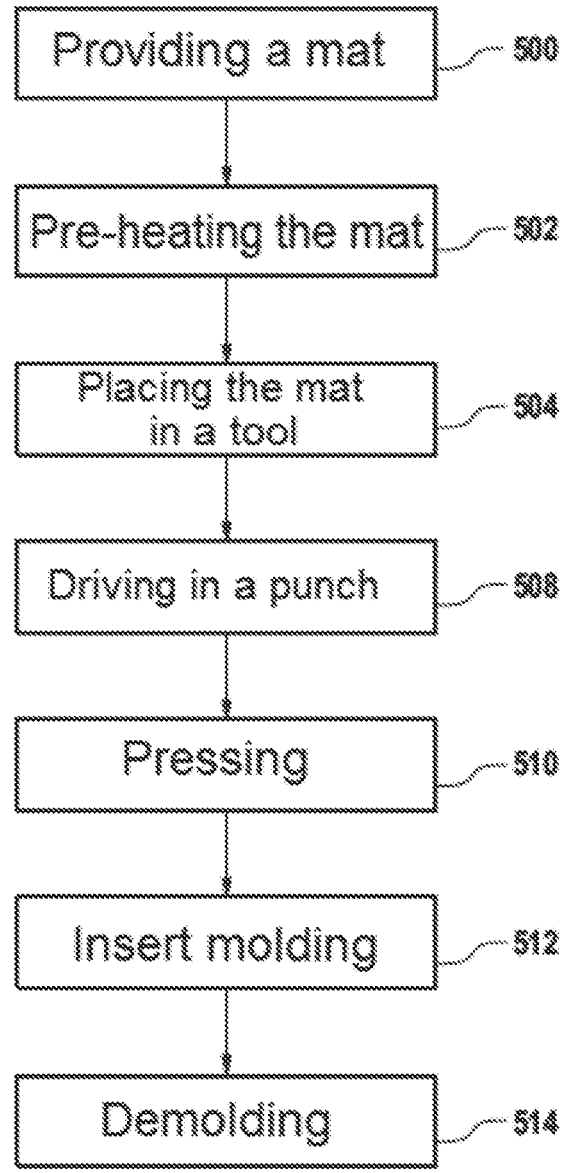
Figure 6:
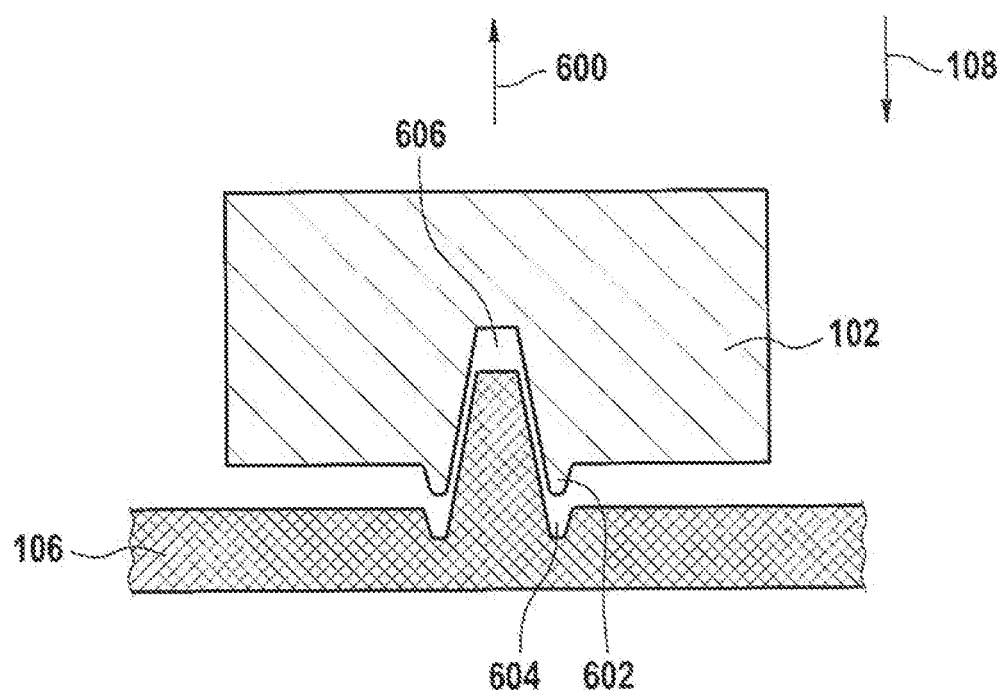

In the drawings:

FIG. 1 shows a schematic view of a device for carrying out the above-described method, FIG. 2 shows a schematic view of a support element, FIG. 3 shows a schematic view of a device for producing a support element in the open state, FIG. 4 shows a schematic view of the device of FIG. 3 with additional punch, FIG. 5 shows a flow diagram of a method for producing a support element for a transport means, FIG. 6 shows a schematic view of part of a device for carrying out the above-described method.

Like elements will be designated hereinafter using like reference signs.

FIG. 1 shows a schematic view of a device 100 for producing a support element for a transport means. The support element here comprises a polypropylene-natural fiber mat 106, wherein the mat has a basis weight below 850 g/m$^2$. The polypropylene-natural fiber mat preferably comprises:

(a) 28-95% by weight of polypropylene/polyethylene copolymer;

(b) 0-10% by weight of fluxing agent;
(c) 1-20% by weight of shock modifier;
(d) 1-20% by weight of compatibility agent;
(e) 3-70% by weight of natural fibers, wherein the polypropylene/polyethylene copolymer forms a matrix in the natural fiber mat.

By way of example, the fluxing agent is a polymer having a cup flow figure between 200 and 2000 g/10 min at a temperature of 230° C. and a load of 2.16 kg.

By way of example, the fluxing agent is a polyolefin which for example has been produced by catalysis of a metallocene.

By way of example, the fluxing agent originates from the group comprising a polypropylene homopolymer, a polypropylene copolymer, a polyethylene homopolymer, or a polyethylene copolymer.

By way of example, the polypropylene-polyethylene copolymer comprises 10 to 90 mol % of ethylene. By way of example, the shock modifier originates form the group comprising the monomer ethylene-propylene-diene (EPdM), the monomer ethylene-propylene (EPM), ethylene-propylene rubber (EPR), polyolefin elastomers (POE), copolymers and terpolymers based on ethylene and propylene, nitrile-butadiene rubber (NBR), isobutylene (IB), chlorinated rubber, poly(styrene-butadiene-styrene) (SBS), styrene-ethyl ene-butene-styrene (SEB S) copolymer, isobutylene-isoprene rubber (IIR), styrene-isoprene-styrene (SIS) copolymer, chloro-polyethylene (CM), isoprene, ethylene-butene, and mixtures and derivatives thereof.

By way of example, the compatibility agent originates from the group of polyolefins trickled through carboxylic acid or through esters or anhydrides.

By way of example the natural fibers originate from the group comprising cotton, linen, flax, hemp, flax or hemp from manila or abaca, banana, jute, ramie, bast, sisal, gorse, wool, alpaca, mohair, cashmere, angora, silk, bamboo, miscanthus, kenaf, coconut, agave, sorghum, switchgrass and wood.

By way of example, the polypropylene-natural fiber mat comprises 10-30% by weight of the natural fibers. 30-70%/ NFPP has 50% natural fibers.

Such a polypropylene-natural fiber mat provides the challenge that a high mechanical stability, in particular a high modulus of elasticity, must be ensured in spite of the very low basis weight. For this purpose the mat 106 is firstly placed in the device, referred to hereinafter as a "tool". The tool 100 here has two mutually opposed parts 102 and 104. It is assumed hereinafter, without limitation of the generality, that the part 104 is rigid, whereas the part 102 can be moved in the direction 108 and against the direction 108 towards the part 104 and away from the part 104 respectively. In the open state a distance between the part 102 and the part 104 is provided such that the mat 106 can be positioned in the gap defined as a result.

Before the mat 106 is placed in position, the mat is heated to a predefined temperature, in particular to a temperature of 200° C. The polypropylene material of the mat is thus made soft, such that a deformation process is possible. It should be noted that the tool itself is unheated. The following step of closing the tool and of pressing the mat must therefore be carried out quickly.

The tool 100 is closed by moving the part 102 in the direction 108 towards the part 104. This causes the mat 106 to assume the desired form on account of this pressing process. After the pressing of the mat into the predefined form by the tool 100, the thickness of the mat is less than 1 mm.

Such a pressed mat is shown by way of example in FIG. 2. As can also be seen in FIG. 2, the mat on the rear side thereof has stiffening ribs 200. These are used to provide the mat with a high modulus of elasticity, although said mat is extremely lightweight and thin.

In order to form the rib structure on the rear side of the mat, a polypropylene-containing material approximately 190° hot is injected into a cavity 112 immediately and directly after the pressing of the mat. The cavity is a rib-shaped cavity 112 beneath the mat 106. This polypropylene-containing material will contact the surface of the polypropylene-natural fiber mat 106 and bond integrally thereto. Said stiffening ribs are thus formed in the cavity 112 and are also shown in greater detail in FIG. 2.

It should be noted at this juncture that the cavity 112 has a very small cross section. It is thus ensured during the pressing process, even at the points of the cavity, that the mat experiences a high pressing, even in the region of the cavity. The fact that the pressing in the region of the cavity 112 does not correspond here to 100% of the pressing in which the part 102 and the part 104 could contact one another without cavity could be advantageous: due to the slightly looser pressing in the region of the cavity, the bonding of the polypropylene-containing material to the natural fiber mat could be strengthened. This is because the liquid material of the polypropylene-containing material here could better penetrate the natural fiber mat, whereby the bonding of the created stiffening ribs to the mat could be improved.

In order to now further increase the bonding strength of the stiffening ribs 200 to the mat 106, the tool 100 for example can introduce depressions in the mat 106 during the pressing. During the pressing process a depression 120 can be generated in the mat 106. The mat 106 provides "side walls" 122 in the depression. If the polypropylene-containing material is now injected into the depression 120 for the insert molding process, these side walls thus additionally provide contact faces for an integrally bonded connection between mat 106 and the material. The ultimately formed stiffening ribs will protrude beyond the lower edge of the depression 120. On the whole, stiffening ribs produced hereby are fixedly embedded in the mat 106.

Following the insert molding of the mat by the injection of the polypropylene-containing material into the rib-shaped cavity 112, a demolding and removal of the mat 106 comprising the stiffening ribs can take place following a suitable cooling process.

If polypropylene-containing material containing natural fibers is used for the insert molding process d, the mat also consisting of said natural fibers for example, the coefficient of thermal expansion will thus be lower than in the case of a material without natural fibers, on account of the natural fiber proportion. Experiments have revealed that, with use of the above-described material composition (which is also used for the mat), a very small shrinkage of the stiffening ribs of just 0.38-0.83% has taken place 3 hours after the demolding and exposure of the insert-molded mat to a room temperature environment. If here a conventional polypropylene-containing material were used, the shrinkage would usually be twice as great.

A warping of the mat during the cooling process is avoided as a result of the low shrinkage.

In order to now further increase the stability of the mat 106, it is possible for corresponding inner edges 202 or outer edges 204 of the mat to corresponding recesses of the mat to comprise predefined bulged regions. These bulged regions may result from the pressing process, i.e. may be defined by the pressing process itself. However, the bulged regions 202 and 204 are preferably defined as a result of said above-described insert molding process of the mat by injection of the polypropylene-containing material into cavities to be defined accordingly. Besides the hollow cavity 112, as shown in FIG. 1, the workpiece 100 thus comprises further cavities and further corresponding slide bars in order to define these bulged regions 202 and 204. The slide bars do not define the cavities, the cavities are contained in the tool form. The slide bars release bulged regions or ribs with undercuts in order to better demold these.

FIG. 3 shows an exemplary tool 100 having two parts 102 and 104, which correspond substantially to the corresponding parts of FIG. 1, but have a slightly more complicated shaping. If the mat 106 is now placed in the space between part 102 and 104 and the part 102 is moved theretowards in the direction 108, the mat 106 would be overstretched between the points designated by reference signs 300 and 302 during the closing process of the tool. The reason for this lies in the fact that, during the closing process, parts of the mat 106 are already fixed between the parts 102 and 104, whereas other parts still continue to be moved during the closing process as a result of the movement of the part 102. On the whole, an inhomogeneity of the density of the mat and of the basis weight could thus result. An inhomogeneity, however, corresponds to a different mechanical load-bearing capability of the mat at different points.

In order to avoid this a pneumatic punch 400 is provided on the upper part 102, as shown in FIG. 4. The punch 400 can press the mat 106 onto the part 104 before the closing process of the tool 100. This pressing process is merely local here, such that parts of the mat 106 located to the left and right of the punch may "shift" in the direction of the punch 400. There is thus no stretching of the mat 106 during the pressing process of the mat 106 via the punch 400.

If the tool 100 is now closed by moving the part 102 in the direction 108 of the punch 104, the part 102 will press the other regions of the mat 106 onto the part 102 without stretching the mat 106 as the tool is closed.

It should be noted that a punch 400 as shown in FIG. 4 can exert a force onto the mat 106, both starting from the part 102 in the direction of the part 104 and conversely starting from the part 104 in the direction of the part 102 against the direction 108. Stretching of the mat as the tool 100 is closed can thus be reliably avoided in a versatile manner in accordance with the respective geometric form of the parts 102 and 104.

FIG. 5 shows a flow diagram of a method for producing a support element for a transport means. The method starts with step 500 and the provision of the mat in the unpressed state. The mat is pre-heated in step 502 and is then immediately placed in the unheated tool (step 504). In step 508 a punch can now be moved towards the mat so as to thus fix the mat in the tool at predefined points. The predefined points are selected here such that a stretching of the mat as the tool is closed is avoided. Directly following the closure of the tool the mat is pressed in step 510, such that said mat has the desired density following the pressing process.

Immediately and directly after the completion of the pressing process in step 510, the mat is insert molded by injection of a polypropylene-containing material into a rib-shaped cavity, which is arranged on the tool. The material and the mat form an integrally bonded connection on account of the insert molding, whereby corresponding integrally bonded stiffening ribs are formed.

In step 514, lastly, the mat comprising the stiffening ribs is then demolded.

FIG. 6 shows a schematic view of part of a device for carrying out the above-described method. In contrast to FIG. 1, with regard to the part 102, an indentation 606 is provided in the part 102, wherein protrusions protrude from the part 102 to the left and right in the direction 108 of the mat 106 to be pressed. During the pressing process, i.e. force effect in the direction 108, the protrusions are pressed into the mat 106, whereby small notches 604 are created in the mat. The protrusions, in the state pressed onto the mat, cause a lateral sealing of the indentation, such that a discharge of the soft polypropylene from the indentation during the pressing process is prevented. This is true in particular also in the case of the optional foaming of the polypropylene, as a result of which the polypropylene additionally attempts to expand in the indentation 606.

The protrusions 602 could be particularly advantageous in the case of the Core-Back Expansion (CBE) method, in which, following the injection of a gas, the foaming tool is opened a little in the direction 600 so as to give the material space to foam up. With a slight opening of the foaming tool the side walls of the stiffening ribs are still stabilized a little by the downwardly protruding protrusions and are therefore protected against lateral deformation (caused by expansion).

LIST OF REFERENCE SIGNS

102 part
104 part
160 mat
108 direction
112 cavity
120 depression
122 edge of the mat
200 stiffening rib
202 bulged region
204 bulged region
300 point
302 point
400 punch (advancer)
600 direction
602 protrusion
604 notch
606 indentation

The invention claimed is:

1. A method for producing a support element for a transport means, wherein the method comprises the steps of:
   providing a polypropylene-natural fiber mat, wherein the mat has a basis weight below 1150 g/m², wherein the polypropylene-natural fiber mat comprises a first type of natural fibers,
   pre-heating the mat,
   placing the mat in a tool, wherein the tool has a rib-shaped cavity,
   pressing the mat into a predefined form by the tool such that the thickness of the mat after the pressing is less than 1.5 mm,
   immediately and directly after the pressing, insert molding the mat by injecting a polypropylene-containing material into the rib-shaped cavity, wherein, on account of the insert molding, the material forms stiffening ribs bonded integrally to the mat,
   demolding the mat comprising the stiffening ribs.

2. The method according to claim 1, wherein the polypropylene-containing material has a second type of natural fibers.

3. The method according to claim 1, wherein the polypropylene-containing material is heated for the insert molding process to 180-200° C. and the mat is pre-heated to 180-220° C.

4. The method according to claim 1, wherein the pressed mat has a basis weight below 850 g/m² and a density above 0.8 g/cm³.

5. The method according to claim 1, wherein the tool forms depressions in the mat during the pressing, wherein the depressions extend parallel to the rib-shaped cavity, wherein the stiffening ribs completely fill out the depressions and protrude from the depressions in a rib-shaped manner on account of the insert molding.

6. The method according to claim 1, wherein the ratio of rib height to rib width of the stiffening ribs is greater than 3.

7. The method according to claim 1, wherein the distance between stiffening ribs extending parallel to one another is between 2.5 times to 5 times the height of the stiffening ribs.

8. The method according to claim 1, wherein the tool has two mutually opposed parts, wherein on one of the parts there is arranged a punch movable relative to this part in the direction of the opposite part, wherein the mat is placed in the tool between the two parts, wherein the pressing is performed by closing the tool on account of a reduction of the distance between the parts, wherein, once the mat has been placed in position and before the punch has been pressed, the mat is pressed at predefined points onto the part opposite the punch, wherein the points are selected such that a stretching of the mat as the tool is closed is avoided.

9. The method according to claim 1, wherein the mat comprises inner and/or outer edges to recesses of the mat, wherein the predefined form comprises bulged regions of the edges.

10. The method according to claim 9, wherein the recesses comprise holes, wherein the bulged regions surround the holes fully.

11. The method according to claim 1, wherein the mat is pressed such that, at points at which the stiffening ribs are insert molded, the mat is pressed to a lesser extent than at points which are free from stiffening ribs.

12. A support element for a transport means, produced in accordance with claim 1.

13. The support element according to claim 12, wherein the support element is a motor vehicle interior trim part.

14. The support element according to claim 13, wherein the support element has a basis weight below 1250 g/m².

15. The method according to claim 1, wherein the time between the end of the step of pre-heating and the start of the step of pressing is no longer than 10 seconds.

16. The method according to claim 1, wherein the tool is unheated.

17. The method according to claim 1, wherein the rib-shaped cavity is covered by the mat when the mat is placed in the tool and during the step of insert molding such that the pressing of the mat is less at the rib-shaped cavity than away from the rib-shaped cavity, whereby the bonding of the polypropylene-containing material to the mat is enhanced at the cavity due to looser pressing of the fibers and better penetration of the polypropylene-containing material into the fibers at the rib-shaped cavity.

18. The method according to claim 8, wherein the pre-heated mat has a contour different from said opposite part of the tool such that a portion of the mat is spaced away from said opposite part of the tool when placed in the tool, and wherein the punch presses said portion of the mat toward said opposite part of the tool before the tool is closed so that said portion of the mat is less spaced away from said opposite part of the tool while the tool is closing.

* * * * *